United States Patent

[11] 3,570,363

[72] Inventor Wilbur C. Thomas
 8 Clinton Lane, Dearborn, Mich. 48120
[21] Appl. No. 882,761
[22] Filed Dec. 17, 1969
[45] Patented Mar. 16, 1971
 Continuation of application Ser. No.
 681,850, Nov. 9, 1967

[54] CROP SHEAR KNIFE AND METHOD OF OPERATING SAME
 8 Claims, 6 Drawing Figs.
[52] U.S. Cl................................................. 83/37,
 83/341, 83/345, 83/673
[51] Int. Cl..................................................... B23d 25/12
[50] Field of Search........................................ 83/341,
 342, 345, 37, 38, 673, 674

[56] References Cited
 UNITED STATES PATENTS
 971,022 9/1910 Cooper......................... 83/341X
 2,020,996 11/1935 Crafts............................ 83/342X
 2,052,461 8/1936 Greenwood................... 83/341X
 2,233,922 3/1941 Kaddeland..................... 83/342X
 2,246,957 6/1941 Shields.......................... 83/341
 2,768,690 10/1956 Roberts et al.................. 83/345X
 3,084,582 4/1963 Anderson...................... 83/341

Primary Examiner—James M. Meister
Attorney—Harness, Dickey & Pierce

ABSTRACT: The forward-facing shearing knife of a pair of crop shear knives mounted on adjacent rotatable heads has its shearing face so inclined that when reaching the initial position at which penetration of the work commences, it is approximately perpendicular to the plane of the work, and during the shearing operation it extends angularly away from and rearwardly at an increasing angle with respect to the plane and direction of movement of the stock. The work-engaging end surface of the knife is inclined inwardly and rearwardly with respect to a plane tangent to the shearing edge. The inclination of these two surfaces is such that during engagement with the work the nonradial force vectors on the knife and drum are substantially eliminated, thereby eliminating damaging stresses and improving the shearing of heavy stock such as hot rolled steel plate.

Patented March 16, 1971
3,570,363
5 Sheets-Sheet 1
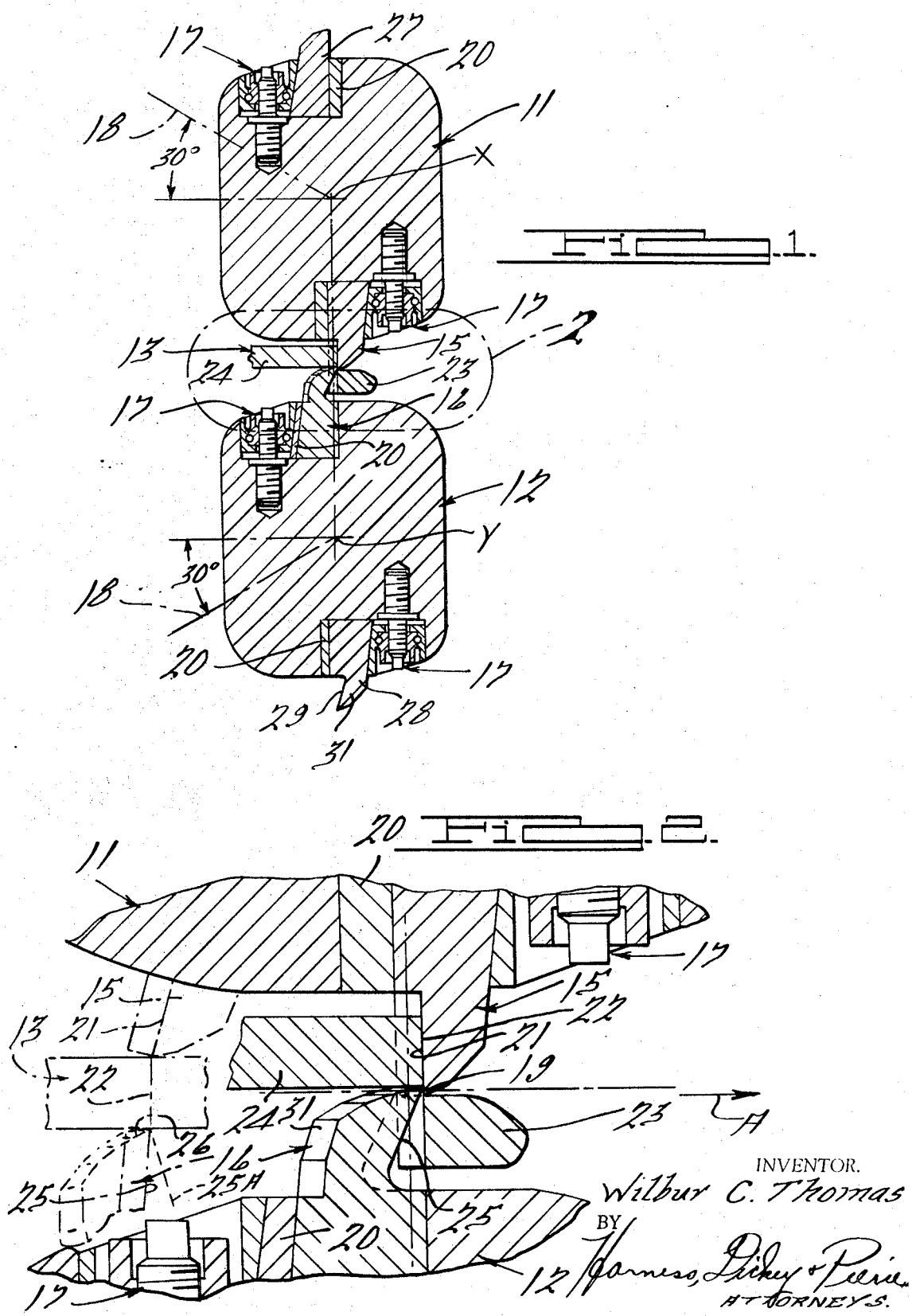
INVENTOR.
Wilbur C. Thomas
BY
Harness, Dickey & Pierce
ATTORNEYS.

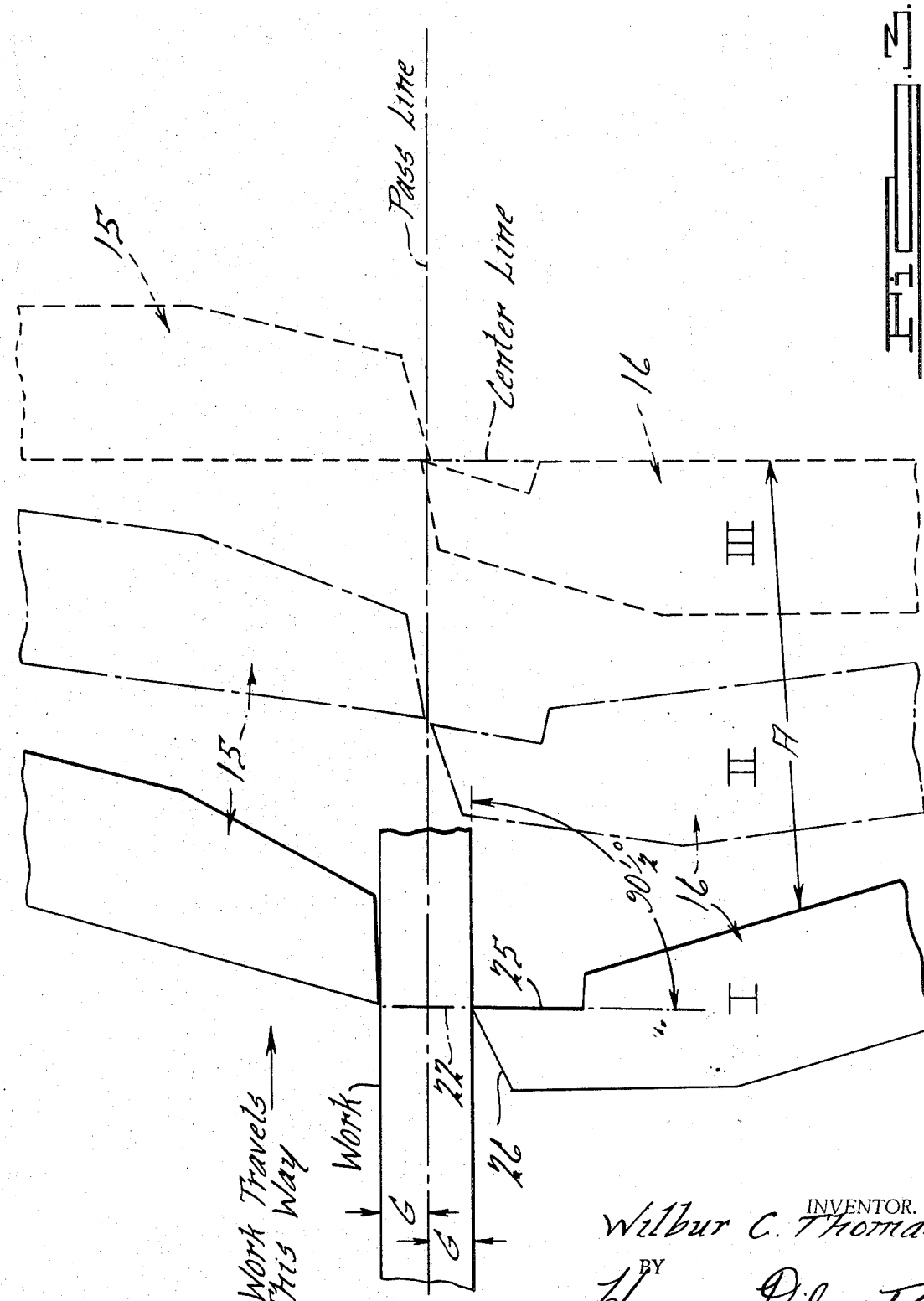

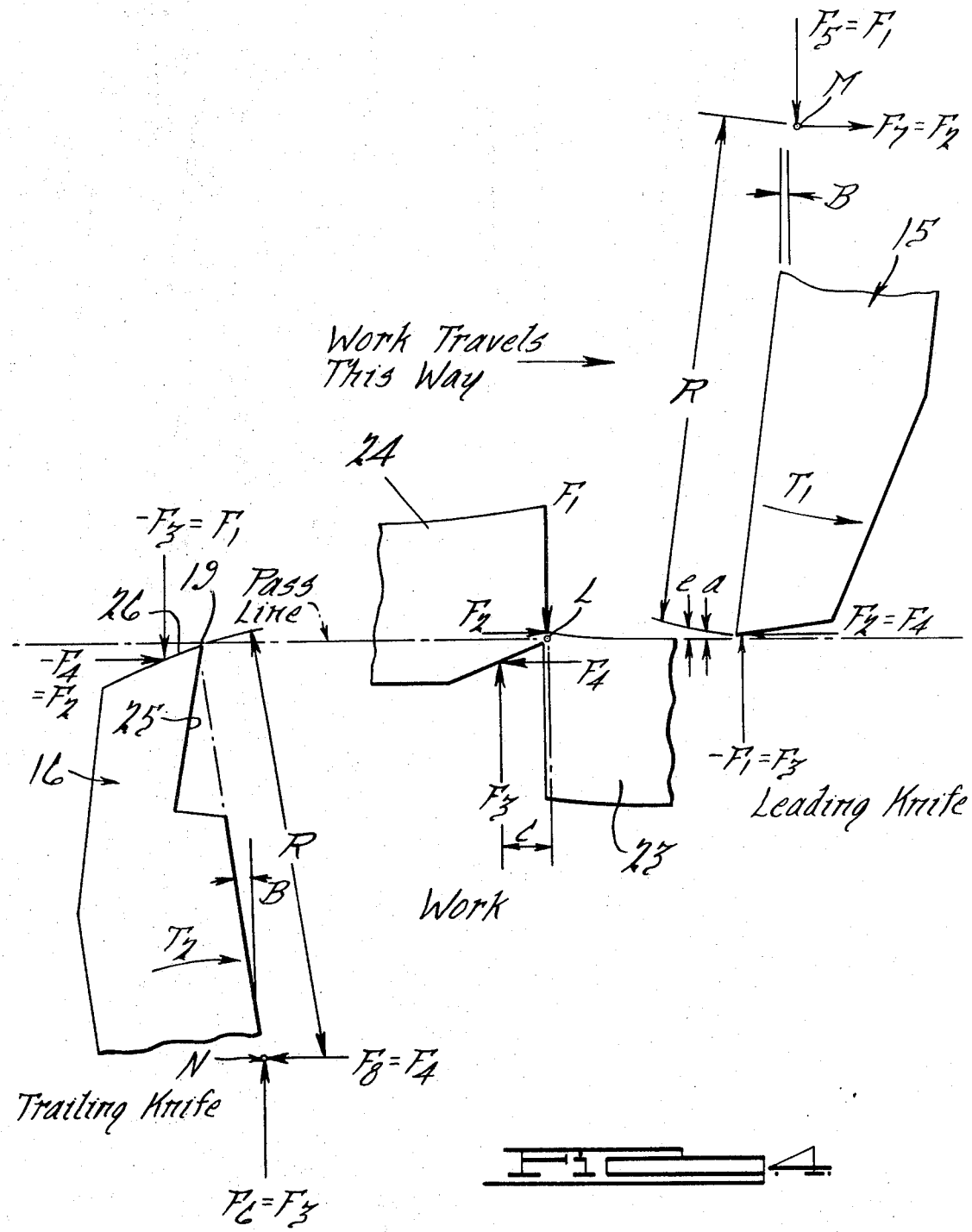

Patented March 16, 1971
3,570,363
5 Sheets-Sheet 4
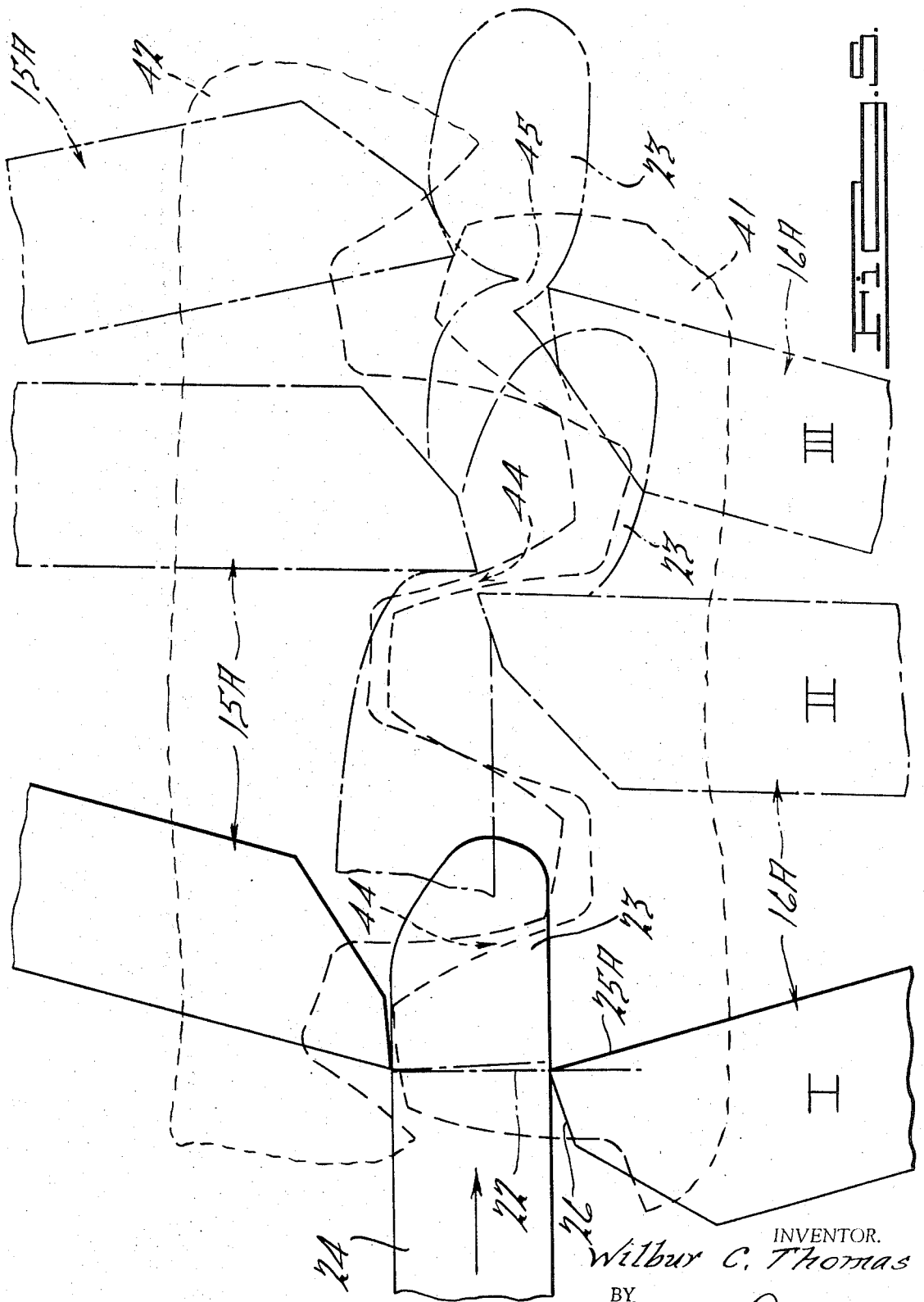
INVENTOR.
Wilbur C. Thomas

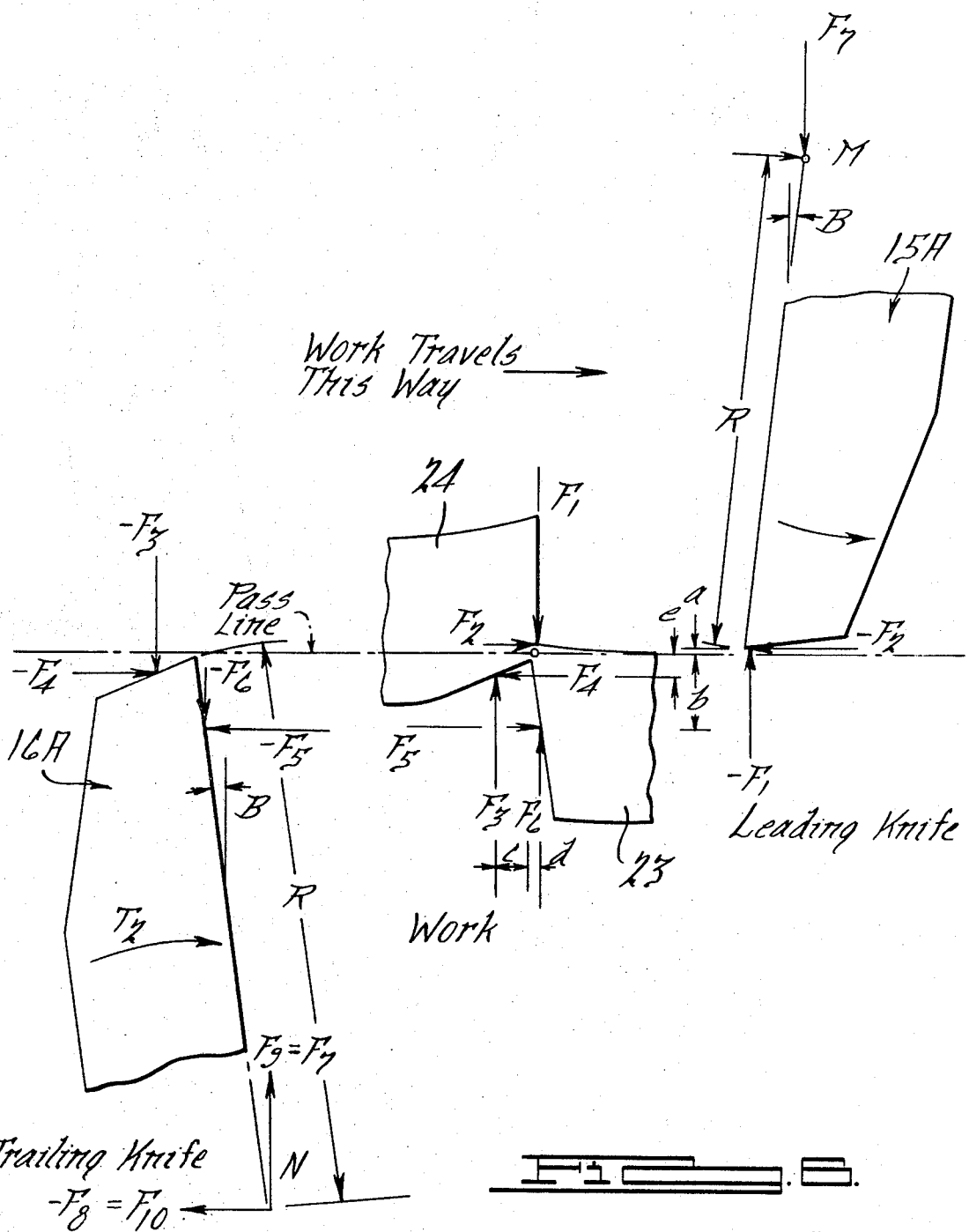

CROP SHEAR KNIFE AND METHOD OF OPERATING SAME

The present application is a continuation of my previously filed copending application Ser. No. 681,850, filed Nov. 9, 1967, now abandoned.

BACKGROUND OF THE INVENTION

Rotatable-head-type shearing units for hot rolled steel plate stock have been employed heretofore which may be up to 4 feet in diameter or even larger. The heads may be 6 or more feet in length requiring knives of substantially the same length. Usually, one or a plurality of sets of knives are employed on the heads and pairs of the knives engage the plate on opposite sides as it is advanced between the rollers, shearing being completed substantially as the cutting edges reach the vertical plane through the axes of the heads. The knives may be straight or may be slightly arced end to end so as to have the centers of the sheared edges disposed forwardly of the ends of such edges. Arcuate contouring facilitates entry of the central portion of the forward edge of the cropped plate into the rolls of a rolling mill, when the plate is fed therethrough to have its thickness reduced. Such knives as heretofore constructed and operated were of like cross-sectional form and the forwardly directed shearing face of one knife was disposed at the same angle to the axis of rotation as the rearwardly directed shearing face of the mating knife, these shearing faces normally being radial. Substantial noise, vibration and wear on the driving gears occurred, and the life of such equipment was relatively short, for reasons not previously understood.

As a result of the undesirable vectors of the heavy forces exerted during the shearing operation, the gears for driving the rolls quickly became worn, requiring early replacement. In studying the operation, it was found that the shape of the knife having the forwardly directed cutting edge is critical, and that when such knives are constructed and operated in accordance with prior practice, the force vectors are such that heavy components are directed nonradially, stressing the gears and drive train beyond desirable limits, and, further, that such knife also incorporates areas which actually interfere with the displacement of a part of the metal, rendering it extremely difficult to reliably produce clean, high-quality cuts of heavy hot-rolled plate on such machines, without frequent costly shutdown of the shear for repairs.

By redesigning the contour of the knife which carries the forwardly directed shearing face, following an improved method of disposing its working surfaces in accordance with criteria derived from the orbit radius and the thickness of the work, I have succeeded in greatly reducing shock, noise and vibration, eliminating excessive wear of the driving gears and improving the quality of cut and the life of the knives and other parts. The accomplishment of these improvements constitutes the overall objective of the present invention.

BRIEF DESCRIPTION OF THE DRAWING

FIG. 1 is a somewhat diagrammatic cross-sectional view of the rotatable heads of a rotary shear having two sets of crop shear knives thereon with one set of knives shown in the position they occupy at the completion of a shear;

FIG. 2 is an enlarged broken and somewhat diagrammatic sectional view of the structure illustrated in FIG. 1, as viewed within the oval 2 thereof;

FIG. 3 is a diagrammatic view showing the knives at successive operative positions with respect to the work and illustrating the triangulation needed to determine the contouring of the trailing knife in accordance with a preferred practice of my invention;

FIG. 4 is a free body diagram indicating the forces in the work and blades during a shearing operation performed in accordance with my invention;

FIG. 5 is a diagrammatic view illustrating three positions showing conventional knives in successive operative positions during the performance of an analogous shearing operation utilizing the prior art apparatus and under typical conditions which exist after wear has occurred in the driving gears of the shear, the related drive gear tooth relationship also being diagrammatically indicated; and FIG. 6 is a force diagram similar to FIG. 4 but showing the forces in the work and blades during a shearing operation performed by a conventional prior art construction such as is illustrated in FIG. 5.

DESCRIPTION OF THE PREFERRED EMBODIMENT

FIG. 1 shows in cross section the rotary heads of a crop shear such as is used for cutting heavy hot-rolled steel plate, the heads being of conventional construction but the knives being of an improved type incorporating my present invention.

The heads 11 and 12 are synchronously driven in rotation in opposite angular directions. In the FIGS. the head 11 is rotated counterclockwise about axis X, while the head 12 is rotated clockwise about axis Y. The forward edge of the work 13 is cropped by a pair of knives 15 and 16 which have the shearing edges arced from end to end to cut a convex end on the forward end of the plate. Shims 20 and clamping mechanisms 17 retain the blades in fixed position on the heads with the arc along which the cut is made falling equal amounts on opposite sides of the center rotation of the heads. The plate 13 is fed to a position centrally between the knives 15 and 16 sufficiently to permit the forward material to be sheared from the plate on the arc of the shearing edges. These features of mounting and curvature are known in the art, the symmetrical forward curvature and resultant convexity of the leading edge of the severed work being provided in order to assist the work to feed into the rolls of a mill. Wording employed in the specification and claims of the present application which refers to the knives of their cutting edges as extending "-generally parallel" or "substantially parallel" to the axis of rotation is therefore intended to encompass both a straight edge paralleled to the axis of rotation, and an edge which diverges symmetrically away from such a straight line from a point midway of its length toward its two ends; as distinguished, for example, from a helical or unsymmetrical edge. The knives 15 and 16 initially will be located approximately 30° above and below the horizontal line between the heads indicated by the dot-dash line 18, whereupon the two heads 11 and 12 will be rotated in synchronous relation to have the knives move toward the plate until the plate is engaged thereby, at a position of initial effective contact just prior to penetration and corresponding to positionI, FIG. 3, whereafter continued rotation of the heads to the position of maximum penetration shown at III causes severing of the stock, which occurs substantially prior to attainment of position III, with hot-rolled steel plate. Because such work severs before the cutting edges of the two knives reach the pass line, it is the present practice in the art to provide no overlap of the knives at full penetration, or only a very slight overlap, as shown. This avoids the necessity of providing any relief angle or back draft on crop shear knives employed to sever heavy and resistant stock such as steel plate having thicknesses of one-half inch and greater. If such relief angles were employed in the ways employed on many tools and cutters intended for other types of work, weakening of the tool would result, and such relief angles have therefore been avoided in the type of service under consideration.

The direction of feed is denoted by arrow A. Heretofore, the two knives have in usual trade practice had the same cross-sectional contour, with shear faces approximately radial, and perpendicular to the plane of the work when the cutting edges have reached the full-in position, as shown in FIGS. 5 and 6.

The outer surface 26 of the knife has in some instances in the past been tangent to the orbit of the cutting edge, or approximately perpendicular to the shearing face, rather than inclined inwardly as shown. In other instances it has been inclined at a small angle with no criterional basis. In a preferred design constructed in accordance with this invention, surface 26 is inclined inwardly from the cutting edge 19 at an angle of approximately 12° to a tangent plane.

The plate is to be sheared along a line 22 and the leading blade 15 is urging the forward part 23 of the plate downwardly while the trailing blade 16 is urging the rearward part 24 of the plate upwardly as the knives move toward the right from the dot-dash position to the full line position shown in FIG. 2. If the trailing knife 16 were of the same contour as the leading knife 15, in accordance with current practice (see blade 16A, FIG. 5) its shearing face 25A would, at the position of initial operative contact, be as indicated in dotted lines at 25A in FIG. 2, and in full lines at position I in FIG. 5, that is, at an angle of substantially less than 90° to the plane of the work. Under such usually employed conditions, the prior art type of trailing knife, during its forward travel from the position of initial operative engagement (position I, FIG. 5) during its penetration of the work upsets metal forwardly of the intended shear line 22, thereby not only resisting the downward movement of the forward portion 23 of the work but due to its angularity also creating a large reactive tangential component (−F5, FIG. 6) rearwardly and which is substantially counterclockwise, as well as a radial inward force reaction (−F6) which also has a counterclockwise component. These components impose a heavy rearward load on the knife 16A, and thereby on the gear 41 which drives the trailing knife head. Such action absorbs much energy, produces heavy pounding noise and vibration, and causes rapid wear of the driving gears.

In FIG. 5 three operative positions of such conventional prior art knives are shown typifying relative positionings they assume after the driving gears have become worn. As shown in position I, representing the point at which initial engagement occurs, the cutting edges of the knives initially engage the work in proper registry with the desired shear line 22. Such proper engagement occurs even if the gears have become worn, because those teeth which are effective to move the knives through that portion of their travel which occurs prior to work engagement are substantially unloaded and therefore do not suffer material wear during use. As the knives penetrate the work, however, the force vectors shown in FIG. 6 develop, and the reactive forces −F6 and −F5 impose a severe rearward load in the manner previously described. The driving gear 42 for the leading knife rotor is subjected to a heavy opposed loading due to the force transmitted through the work. Those teeth of both gears which are in driving engagement during the shearing operation are accordingly subjected to heavy loading which rapidly wears their driving surfaces in the working areas. An excessive clearance therefore unavoidably develops between such teeth, as is represented in FIG. 5 by the gap 44. At position II the leading knife 15A is shown perpendicular to the plane of the work, corresponding to the position of maximum penetration of the leading knife. As also shown at position II, however, the trailing knife 16A, due to the wear corresponding to the gap 44, does not reach the intended position of approximate perpendicularity and close abutting relationship to the knife 15A (as it does prior to wear of the gears) and accordingly knife 16A trails the knife 15A to an exaggerated degree, leaving an unsevered neck 45 in the work between the main mass 24 and the portion 23 which should be cropped (but which under such conditions may not be severed from the main mass at all, depending upon the amount of wear which has occurred and the nature of the work). It will also be seen that during such an operation the end surface of the leading knife 15A drives section 23 downwardly over the front face of the trailing knife 16A, and that if the work remains unsevered at the neck 45, the trailing knife further distorts the work, driving the front section 23 back upwardly as the work and knives continue toward position III. Severe wiping engagements thus occur between the cutting edges and surfaces of the knives and the work. This not only imposes severe loads but dulls the edges.

To alleviate this situation, I form the shearing face 25 of the trailing knife 16 at an angle such that it inclines rearwardly and inwardly from its leading work engaging edge 19 to a degree such that it extends substantially perpendicularly to the face of the work when it first operatively engages the bottom surface thereof. It will be seen that the angle of inclination at the position of initial engagement could be greater than 90°, but that the knife is weakened as this angle is increased. I therefore preferably form the shearing surface at an angle which intersects the shearing edge and which is so related to the radius of the orbit of such edge, and to the thickness of the work, that shearing surface 25 is perpendicular to the plane of the work at the position of initial penetration, and increases as shearing proceeds. The inclination of outer or end surface 26 is also selected so that no material rubbing occurs, and to create a forward force vector on the trailing knife.

Referring to position I of FIG. 3 showing a preferred form of my improved construction more particularly, it will be noted that the cutting edge 25 of the trailing knife is defined by a front surface which is inclined to the radial plane at an angle which slightly exceeds (e.g: by ½°) the minimum angle required in order to position such leading surface perpendicularly with respect to the plane of the work. Such slightly excess angularity or relief insures total elimination of vectors corresponding to F5 and F6, referred to above. It will be noted from the successive positions in FIG. 3 that the shearing action is free to occur along the shear line 22 without creating any angular components other than those shown in FIG. 4.

The actual values of the remaining forces which occur in the knives and work when my invention is used will of course depend not only upon the angularity of the end face 26 but also on the plastic flow properties of the work being cut. The vector arrows in FIG. 4 (and also in FIG. 6) are of course only illustrative, and it will be understood that they vary during operation, but the loads on the knives and drive mechanism are greatly reduced in any event, and the lives of the knives and driving gears are greatly lengthened. The initially set relationship between the knives for proper shearing is maintained for a much longer period of time than has heretofore been possible. As also shown in FIG. 3, the angular section 25 which constitutes the shearing face of the trailing knife extends radially inwardly a distance at least equal to one-half the work thickness plus the knife overlap, and preferably also including at least a slight clearance. For maximum blade strength, however, the inclined shearing face need not extend inwardly farther than is required to provide adequate work clearance. In practice, in sharpening my improved trailing knives, I leave a radial land (19', FIG. 4) at the shearing edge 19 which is not over .060 inches wide. With hot-rolled steel stock sheared by my improved knives a land of this width has been found not to create undue stresses, due, presumably, to the fact that the distorting effect on the land does not stress the work beyond its elastic limit. If the land becomes too wide, however, the effect is similar to a full radial face such as has been employed on prior art knives. The complete shearing occurs when the shearing edges of the knives are substantially in a vertical plane through the axes of the heads, as illustrated in FIG. 2. FIGS. 1 and 2 show curved knives, as noted above, whereas no curvature is indicated in FIGS. 3—6. Both types of knives are commonly used in the trade, and the operating principles are the same, insofar as my invention is concerned.

In such shears the pass line A is tangent to the pitch circle of the gears. The minimum angle which shearing face 25 should make to the radius is derivable from the cosine of the angle between the adjacent side of the hypotenuse of a right triangle whose adjacent side is a radius perpendicular to the pass line and terminating at the closest surface of the work and whose hypotenuse is the radial distance from the axis to the shearing edge, which corresponds to a radius to the position of initial contact. The adjacent side defined by a line which is the shortest (perpendicular) radius to the bottom or nearer plane of the work is equal to $PR-\frac{1}{2}W$. The hypotenuse which is the radial line to the point of initial contact, is equal to $PR+L$, where PR is the radius of the pitch circle, W is the thickness of the work, and L is the overlap between the shearing edge and the pass line. Thus $$\cos x = \frac{PR - 1/2 W}{PR + L}$$

and the proper angle for the shearing face can be derived, when this ratio is numerically solved, from any table of natural trigonometric functions.

The plate 13 can then be retracted or advanced as the decelerating heads continue to rotate beyond the shear point to permit the automatic reverse rotation of the heads to their starting positions which is that wherein the knives are located substantially on the lines 18.

Cropping of the rear end of the plate may be performed by knives 27 and 28 disposed diametrically opposite to the knives 15 and 16, and shown as straight rather than curved. These knives are located on the lines 18 before the shearing operation and the plate 13 is advanced between the heads 11 and 12 until the rear end to be cropped is located in a position to be engaged by the shearing edges of the knives 27 and 28 as they are advanced. It will be noted in this arrangement that knife 28 is similar to knife 16 in cross section, its shearing face 29 being similarly inclined in an amount such that when in engagement with the work the included angle between its shearing face and the surface of the work is at all times substantially equal to or greater than 90°, as in the case of the shearing face 25 of knife 16, and its outer work-engaging surface 36 is inclined similarly to surface 26.

It has been found upon employing crop-knives contoured in the disclosed manner that the heavy noise occurring from initial contact is substantially reduced, the cutting life of the shearing edges is substantially increased, and the excessive wear of the driving gears completely eliminated.

This detailed description of preferred form of the invention, and the accompanying drawings, have been furnished in compliance with the statutory requirement to set forth the best mode contemplated by the inventor of carrying out the invention. The prior portions consisting of the Abstract of the Disclosure and the Background of the Invention are furnished without prejudice in an effort to comply with administrative requirements of the Patent Office.

I claim:

1. In crop shear apparatus for severing relatively thick and resistant stock, said apparatus comprising a pair of knife supports arranged to rotate synchronously in opposite angular directions around parallel axes, a pair of knives one of which is carried by each of said supports and each of which knives has an outer cutting edge extending longitudinally generally parallel to the axis of rotation of its support, said knives being rotatable in circular orbits of like radius into and out of a cutting edge-abutting position which corresponds to maximum stock penetration without substantial overlap of the knives, the novelty which comprises a trailing knife having a forwardly directed shearing face extending inwardly from said cutting edge and inclined rearwardly with respect to a radius at an angle which is so related to the radius and to the thickness of the work that the included forward angle between said shearing face and the work at the position of initial effective contact with the work just prior to penetration is substantially 90° and increases during continued rotation, and a leading knife having a rearwardly directed shearing face extending inwardly from its cutting edge at an included rearward angle which decreases during continued rotation and which, at said position of initial contact, is not less than 90° to the plane of the work and not greater than the angle between the plane of the work and a radial line projected from the cutting edge to the axis of rotation.

2. Crop shear apparatus as defined in claim 1 wherein said trailing knife has an outer surface extending rearwardly away from said cutting edge and shearing face and diverging from the plane of the work at an angle sufficient to create a forward component of force on the knife as it penetrates the work.

3. Crop shear apparatus as defined in claim 1 wherein said included angle between the shearing face of the trailing knife and the stock at said position of initial contact is slightly greater than 90°.

4. Crop shear apparatus as defined in claim 1 including a narrow radial land between the cutting edge and the shearing face of said trailing knife.

5. Crop shear apparatus as defined in claim 1 including a narrow radial land of a width not exceeding .060 inch between the cutting edge and the shearing face of said trailing knife.

6. The method of shearing plate stock in a crop shear which comprises determining the radius of the orbits of the knives and the thickness of the work, arranging the forwardly facing shearing face of the trailing knife to substantially intersect the shearing edge and at an angle such that at its position of initial operative engagement with the work the included angle between the shearing face and the plane of the work is equal to or greater than 90°, arranging the rearwardly facing shearing face of the leading knife to extend inwardly from its shearing edge at an included angle to the work which at said position is not less than 90° to the plane of the work and not greater than the angle between the plane of the work and a radial line projected from the cutting edge to the axis of rotation, and rotating the knives synchronously in opposite angular directions around parallel axes to bring their shearing edges into edge abutting position without substantial overlap and shearing the work while increasing the first-mentioned included angle and decreasing the second-mentioned included angle.

7. The method defined in claim 6 wherein said first-mentioned knife is urged forwardly in its orbit by reaction of the work against an inclined outer surface of the knife.

8. The method of severing heavy metal plate stock or the like with a rotary shear of the type having paired leading and trailing shearing knives orbitally synchronously rotatable in opposite angular directions about parallel axes toward and from a closely adjacent position at an interposed pass line while the stock is moving therebetween along the pass line which comprises determining the length of a straight line from the axis of rotation of the trailing knife to the nearest point on the surface of the stock, determining the length of a radial line from said axis to the pass line, determining the angle corresponding to the cosine of the angle between said lines when a right triangle is constructed therefrom having its hypotenuse corresponding to said radial line and its third side corresponding to a line on the surface of the stock closest to the trailing knife, arranging a forwardly facing shearing surface on the trailing knife at such an angle to a radial line projected to its shearing edge that said shearing surface slopes rearwardly and inwardly with respect to said last-mentioned radial line at an angle which is not materially less than the angle corresponding to such cosine, and shearing the stock in the shear between said knives.